United States Patent [19]

Illetschko

[11] Patent Number: 4,549,213
[45] Date of Patent: Oct. 22, 1985

[54] SYSTEM FOR REDUCTION OF NOISE IN A TELEVISION SIGNAL

[75] Inventor: Gerhard Illetschko, Darmstadt, Fed. Rep. of Germany

[73] Assignee: Robert Bosch GmbH, Stuttgart, Fed. Rep. of Germany

[21] Appl. No.: 611,849

[22] Filed: May 18, 1984

[30] Foreign Application Priority Data

May 28, 1983 [DE] Fed. Rep. of Germany ....... 3319438

[51] Int. Cl.⁴ .......................... H04N 5/21; H04N 5/14
[52] U.S. Cl. .................................... 358/167; 358/166; 358/36
[58] Field of Search .......................... 358/166, 167, 36

[56] References Cited

U.S. PATENT DOCUMENTS 4,090,221  5/1978  Connor ............................. 358/167
4,485,403  11/1984  Illetschko .......................... 358/167

Primary Examiner—John C. Martin
Assistant Examiner—E. Anne Toth
Attorney, Agent, or Firm—Frishauf, Holtz, Goodman & Woodward

[57] ABSTRACT

An improved movement detector (8) for a television noise reduction system interposes a recursive filter (12) between the absolute value circuit (9) which signalizes the magnitude difference between delayed and undelayed television signals and the function generator (11) which forms the correction factor k which controls the degree of noise reduction. Especially for filtering changes in the vertical direction and the recursive filter involves a considerable saving in equipment.

2 Claims, 1 Drawing Figure

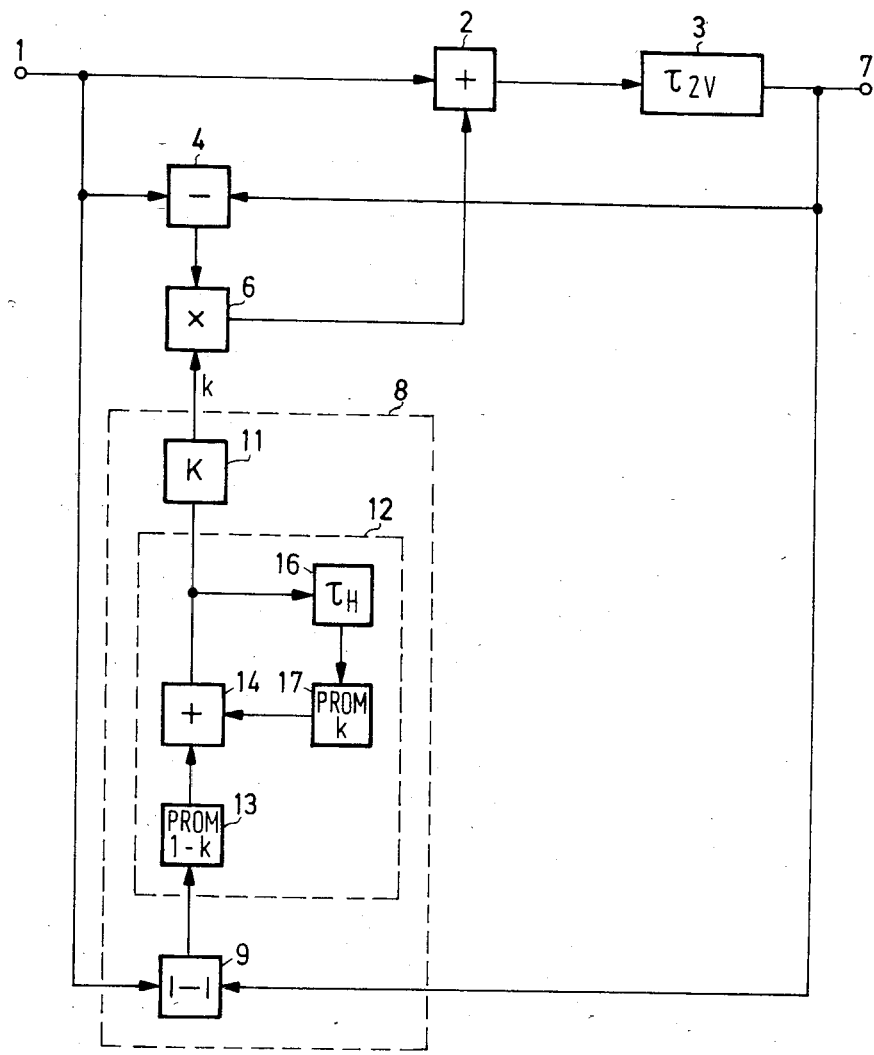

SYSTEM FOR REDUCTION OF NOISE IN A TELEVISION SIGNAL

This invention concerns television noise reduction system in which the television signal is delayed for one frame and then the delayed and undelayed signals are combined by forming the difference and weighting with a correction factor, after which the combined signals are added to the undelayed signal and in which a movement signal is derived by forming the absolute difference between the delayed and undelayed signals and passing the result through a circuit of variable transmission characteristic containing a low-pass filter for controlling the correction factor.

Systems for reducing noise in television signals are known in which the television signals are delayed by one frame period and after weighting with a correction factor are added to an also weighted undelayed television signal. The operation of this known system depends upon the fact that differences from one frame to the next are averaged out. This averaging not only has the desired noise reduction but also the consequence of loss of sharpness where there is movement in the picture. It is therefore necessary to reduce the averaging in the case of movement. Means are, therefore, to be provided which make possible distinctions between differences caused by noise and differences caused by movement.

For this purpose a system is known from German published patent application No. (OS) 29 37 284 for detecting television picture movement, by forming the difference between the undelayed and the delayed television signals and passing the result through a low-pass filter. That is done on the basis that small picture details in movement cannot be distinguished by the eye. A low-pass filter for the movements signal in the horizontal and/or vertical direction suppresses the corresponding noise components in the movement signals. The kind and configuration of the low-pass filter involved is not disclosed in that German published patent application.

SUMMARY OF THE INVENTION

It is an object of the present invention to provide a television noise reduction signal of the general kind discussed above in which a more suitable low-pass filter is incorporated for noise reduction in the movement signal.

Briefly, a recursive digital filter is used for processing the absolute difference signal before its application to the control of the generation of the correction factor. More particularly, in that recursive digital filter, a neighboring pixel, either in the vertical or horizontal direction or both, obtained by a suitable delay circuit from the output of the filter, is weighted and added to the complementarily weighted input movement signal. Especially where simply the vertically adjacent pixel is used for low-pass filtering, the equipment expense and space saving is substantial compared to previously available circuits for reducing the noise component of the movements signal.

BRIEF DESCRIPTION OF THE DRAWING

The invention is further described by way of illustrative example with reference to the annexed drawing, the signal figure of which is a circuit block diagram of a noise reduction circuit embodying the invention.

DESCRIPTION OF THE ILLUSTRATED EMBODIMENT

In the circuit shown in block form in the single figure of the drawing, the television signal which is to have its noise component reduced enters the circuit at the terminal 1 and proceeds to an adding circuit 2 where it is added to a correction presently to be described, after which the sum signal formed in the addition circuit 2 is supplied to a delay unit 3 where the television (sum) signal is delayed for the period of one frame, the period being designated $\tau_{2V}$ because it corresponds to twice the period of the vertical scan. Such delay units are well known and are advantageously constituted as a full frame digital store into which the signal is written in and then is read out one frame later (the drawing assumes that the television signal at the input 1 is in the form of a sequence of picture-point (pixel) digital signals).

The delayed output signal from the delay unit 3 is supplied to a subtraction circuit 4 where the undelayed signal (of the next frame) present at the terminal 1 is subtracted from the delayed signal. The output of the subtraction circuit 4 is supplied to a multiplier circuit 6 where it is multiplied by a factor less than unity further described below. The output of the multiplier 6, is furnished to a second input of the adding circuit 2. Thus, the combination made up of the circuits 2, 3, 4 and 6 operates as a so-called recursive filter which averages and thereby reduces the signal amplitudes which do not repeat from frame to frame.

The degree of this averaging or integration is determined by a factor k supplied to the multiplier circuit 6. The more that k approaches the value 1, the stronger is the effect of the filter and the stronger, therefore, is the time over which the averaging (integration) is performed. The television signal with reduced noise can be taken off from the terminal 7. In the case of motionless pictures a practically unlimited noise reduction is possible when the integration can be prolonged to any extent desired.

In the case of moving pictures the integration deteriorates the sharpness of the edges, making the pictures less distinct, so that the integration is to be reduced when movement appears in the picture. For this purpose a so-called movement detector 8 is provided to which, again, the television signals present at the terminals 1 and 7 are supplied. The movement detector 8 consists essentially of a difference-forming device 9, but because the effect to be produced on the noise reduction process should be independent of the sign of the change of the picture content, the difference produced in the device 9 is further treated to provide a signal corresponding to its magnitude regardless of sign. According to the magnitude of change detected by the circuit 9 a correction factor k for the degree of noise reduction is produced in a k-generator circuit 11 which may be regarded as a function generator.

Since, in addition to movements, noise also leads to an output signal in the device 9 but should not contribute to the control of the integration process, a low-pass circuit which filters out high frequency changes in the output of the device 9 is interposed between the output of the device 9 and the control terminal of the k-generator 11.

The low-pass circuit 12, in accordance with the invention, is constituted as a recursive filter. It contains a store 13 (a programmable read-only memory PROM)

which weights the movement signal obtained from the device 9 by the factor (1-k). Furthermore, an adding stage 14 is provided in the path of the movement signal in which there is added the output of a PROM store 17 which weights with the factor k a delayed output of the addition circuit 14, the delay in this case being a delay of one television line ($\tau_H$) in the delay unit 16, which provides information regarding a pixel which is adjacent in the vertical direction. Instead of a delay of a television line interval in the delay unit 16 a delay for one pixel period ($\tau_B$) could be provided, or in addition thereto a signal delayed for one pixel period could be averaged with the output of the store 16 before weighting with the factor k and addition to the movement signal.

The elements 13-17 constitute a low-pass circuit 12 (digital low-pass filter) which is distinguished from other digital low-pass filters, for example transversal low-pass filters, especially when used for the vertical direction of the picture as shown in the drawing, the distinction being that there is substantially less circuit expense for a comparable degree of noise reduction in the movement signal. The properties of the recursive filter which at first sight appear to be disadvantageous in the transmission therethrough of television signals, such as unsymmetrical transient response and nonlinear group propogation time are only of small consequence for their application to movement detectors, because the movement signal, after its low-pass filtering, must still be converted for generation of the noise-reduction factor k by characteristic curves identifying or stored in the function generator 11.

The factor k utilized by the PROMs 13 and 17 may be the same factor generated by the function generator 11, in which case an output of the function generator 11 must cotribute to the addressing of these PROMs, or else a fixed factor k and not the variable output of the function generator 11 may be used for the PROMs 13 and 17.

Although the invention has been described with reference to a particular illustrative embodiment, it will be seen that variations and modifications are possible within the inventive concept.

I claim:

1. Apparatus for reducing noise in digital television signals comprising means (3) for delaying digital television signals for the period of a television frame and having an input and an output, means (4) connected to a source (1) of first subtraction digital television signals and the output of said delaying means (3) for producing difference signals corresponding to the difference between signals simultaneously present at said source and at said delay means output, multiplier means (6) for multiplying said difference signals by a correction factor (k) of a magnitude between 0 and 1 to produce a weighted difference signal, addition means (2) for adding said weighted difference signal to each digital television signal provided by said source (1) to produce a sum signal and furnishing the same to said delay means input, means (g) including second subtraction means connected to said delaying means output and to said source, for producing a difference magnitude signal independent of sign, a function generator (11) for producing a signal representative of said correction factor (k) and furnishing the same to said multiplier means (6), and for varying said correction factor signal in response to a control signal input, and variable transmission characteristic filter means responsive to said difference magnitude signal and having an output connected to said control signal input of said function generator for reducing the effect of noise components of said difference magnitude signal on said control signal input, said filter means being a recursive filter including:

means (13) for weighting said difference magnitude signal with a factor (1-k') of a value between 0 and 1 and providing a weighted difference value signal at its output;

second addition means (14) for adding said weighted difference signal to a complementarily weighted delayed difference magnitude signal derived from the output of said second addition means, to produce a modified difference magnitude signal said control input of said function generator (11);

second delaying means for delaying said modified difference magnitude signal by a period of time related to the time difference in a digital television signal between digital signals representative of adjacent pixels; and means (17) for weighting the output of said second delaying means to an extent complementary to the weighting of said difference magnitude signal and providing said weighted delayed signal to said second addition means (14).

2. Apparatus according to claim 1 in which said second delaying means is constituted to produce a delay corresponding to the period of the television horizontal scan frequency.

* * * * *